(12) United States Patent
Musgrave et al.

(10) Patent No.: US 10,037,724 B2
(45) Date of Patent: Jul. 31, 2018

(54) INFORMATION HANDLING SYSTEM SELECTIVE COLOR ILLUMINATION

(71) Applicant: Dell Products L.P., Round Rock, TX (US)

(72) Inventors: Kenneth Musgrave, Austin, TX (US); Stefan Peana, Austin, TX (US); Deeder M. Aurongzeb, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 179 days.

(21) Appl. No.: 14/845,648

(22) Filed: Sep. 4, 2015

(65) Prior Publication Data

US 2017/0069241 A1 Mar. 9, 2017

(51) Int. Cl.
*G09G 3/20* (2006.01)
*G06F 3/01* (2006.01)
*G09G 3/3208* (2016.01)
*G06F 3/03* (2006.01)
*G09G 5/10* (2006.01)
*G09G 5/02* (2006.01)
*G06F 3/14* (2006.01)
*G09G 5/14* (2006.01)

(52) U.S. Cl.
CPC .......... *G09G 3/2003* (2013.01); *G06F 3/013* (2013.01); *G06F 3/0304* (2013.01); *G09G 3/3208* (2013.01); *G06F 3/1423* (2013.01); *G09G 5/02* (2013.01); *G09G 5/10* (2013.01); *G09G 5/14* (2013.01); *G09G 2320/0233* (2013.01); *G09G 2320/046* (2013.01); *G09G 2320/048* (2013.01); *G09G 2320/0613* (2013.01); *G09G 2320/0686* (2013.01); *G09G 2354/00* (2013.01)

(58) Field of Classification Search
CPC .......... G06F 3/013; G06F 3/012; G06F 3/147; G06F 3/011; G06F 3/016; G06F 3/017; G06F 3/0202; G06F 3/0414; G06F 3/044; G06F 3/045; G06F 3/0481; G06F 3/04817; G06F 3/04842; G06F 3/04845; G06F 3/048
See application file for complete search history.

(56) References Cited

U.S. PATENT DOCUMENTS

| 2003/0146897 | A1* | 8/2003 | Hunter | G09G 3/342 345/102 |
| 2005/0243039 | A1* | 11/2005 | Kwak | G09G 3/3233 345/76 |
| 2006/0087502 | A1* | 4/2006 | Karidis | G06F 1/3203 345/211 |
| 2006/0273997 | A1* | 12/2006 | Nathan | G09G 3/3241 345/78 |

(Continued)

*Primary Examiner* — Koosha Sharifi-Tafreshi
(74) *Attorney, Agent, or Firm* — Zagorin Cave LLP; Robert W. Holland

(57) ABSTRACT

A display presents information as visual images with plural pixels, each pixel having red, green and blue OLED films that illuminate with varying intensity defined by pixel values generated by a graphics processor. An image adjuster alters the pixel values for pixels located outside the field of view of an end user so that degradation of OLED material occurs in a balanced manner, such as by reducing illumination of blue OLED material, which tends to degrade at a more rapid rate than red and green OLED material.

19 Claims, 4 Drawing Sheets

(56) References Cited

U.S. PATENT DOCUMENTS

| | | | |
|---|---|---|---|
| 2008/0129662 A1* | 6/2008 | Yoo | H04N 21/44008 345/84 |
| 2011/0298826 A1* | 12/2011 | Namba | G06F 1/1616 345/635 |
| 2012/0272179 A1* | 10/2012 | Stafford | G06F 3/012 715/781 |
| 2013/0257884 A1 | 10/2013 | Koh | |
| 2014/0071179 A1* | 3/2014 | Na | G09G 5/10 345/690 |
| 2014/0229875 A1* | 8/2014 | Li | G06F 3/0484 715/771 |
| 2015/0339046 A1* | 11/2015 | Hegde | G09G 5/377 715/798 |
| 2016/0133229 A1* | 5/2016 | Inoe | G09G 5/026 345/690 |
| 2016/0205391 A1* | 7/2016 | Kim | H04N 13/0468 348/51 |
| 2016/0379551 A1* | 12/2016 | Zhuang | G09G 3/3208 345/520 |

* cited by examiner

INFORMATION HANDLING SYSTEM SELECTIVE COLOR ILLUMINATION

BACKGROUND OF THE INVENTION

Field of the Invention

The present invention relates in general to the field of information handling system displays, and more particularly to an information handling system display selective color illumination.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems come in a variety of forms, shapes and sizes with a variety of performance characteristics. Generally information handling systems execute instructions, accept end user inputs and present output to an end user as visual information at a display device. End user experience often varies considerably based upon the type of display used to present information. Early displays used cathode ray tube (CRT) display devices that excited phosphor with an electron beam to illuminate pixels. CRT displays were largely replaced over recent years by liquid crystal display (LCD) devices that filter a backlight with liquid crystals located in each pixel. Both CRT and LCD devices create images by scanning across plural pixels in a scan pattern with each pixel having a color value determined by a graphics controller. Generally, the color is formed by illuminating or passing through different amount of red, green and blue light.

Recently, organic light-emitting diode OLED display devices have garnered interest as a replacement for LCD devices. OLED devices generate images with pixels much like CRT and LCD devices but instead excite an emissive electroluminescent layer of an organic compound film to emit light in response to an electric current. OLED display devices tend to weigh less than LCD devices, provide a flexible film to adapt to curved display surfaces, offer more responsive display information and use less power. These characteristics make OLED display devices an attractive alternative for portable information handling systems, such as smartphones, tablets and laptops.

One difficulty with OLED display devices is that the organic material tends to breakdown over time resulting in changing appearances of images presented at the OLED display devices. In particular, OLED material tends to degrade at different rates over time and based upon the amount of use at different pixels. OLED displays generate images by illuminating red, green and blue films with different intensities to generate colors. Prolonged illumination of a color in an area of a display will result in uneven response across pixels as the OLED material in that area degrades at a different rate than other area. Further, the different OLED film materials used to generate red, green and blue light also deteriorate at different rates. In particular, the OLED material used to generate blue light tends to deteriorate at twice the rate of red and green materials. Unfortunately, the blue material also tends to cost more than the red and green materials. Although image compensation can adjust for degradation of materials, the limited life of OLED display material presents a challenge to the adoption OLED displays in electronic devices that are expected to have extended lifespans.

SUMMARY OF THE INVENTION

Therefore, a need has arisen for a system and method which enhances OLED display device lifespans.

In accordance with the present invention, a system and method are provided which substantially reduce the disadvantages and problems associated with previous methods and systems for extending display device lifespans. User presence at a display is sensed to identify a field of view for illumination of image-defined colors so that pixels out of the field of view may have illumination colors adjusted to enhance display pixel OLED film life and continuity.

More specifically, an information handling system presents information as visual images at a display. A processor generates visual information for presentation at a display. A graphics processor processes the visual information to create pixel values that the display applies to define light illuminated from each of plural pixels so that the visual information is presented at the display as a visual image. Each pixel includes plural OLED films that are individually illuminated by a current according to the pixel value so that the pixel illuminates at a defined color, brightness and contrast to cooperatively generate the visual image at the display. An image adjuster associated with the graphics processor adjusts the pixel values from the value defined by the visual information to an adjusted value that alters the illumination from predetermined of the pixels based upon a predetermined condition so that OLED film in the pixels degrades in a uniform manner. For example, a camera disposed proximate the display captures an image of a viewing area where an end user typically views the visual images to detect a field of view of the end user, such as based upon the position of the end user or direction of the end user's eye scan. The image adjuster determines a field of view of the end user in which visual images are presented unadjusted, and adjusts pixel values outside of the field of view to illuminate in a manner that provides a more uniform degradation of OLED films. For instance, with pixels outside of the field of view, blue illumination is reduced to adjust for the more rapid degradation of blue OLED film.

The present invention provides a number of important technical advantages. One example of an important technical advantage is that degradation of OLED film at a display is managed to maintain a uniform display appearance over time. Blue OLED film in particular is illuminated with reduced intensity when the display presents an image that does not fall within an end user's field of view. As the end user shifts his field of view, detection of the new field of view by images captured with a camera provides unadjusted pixel values to display areas previously outside of the field of view and adjusted pixel values to areas previously within the field of view. Adjustments to pixel values are performed to provide minimal disruption to the end user viewing experience while seeking to lead to a uniform image appearance over time. By tracking pixel usage, adjusted values account for degradation that has occurred, thus leading to a better user experience with a longer display life and more uniform appearance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system visual information presented as visual images at an OLED display device are adjusted to adapt to an end user field of view so that pixel degradation is managed with adjusted pixel values outside of the end user field of view. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
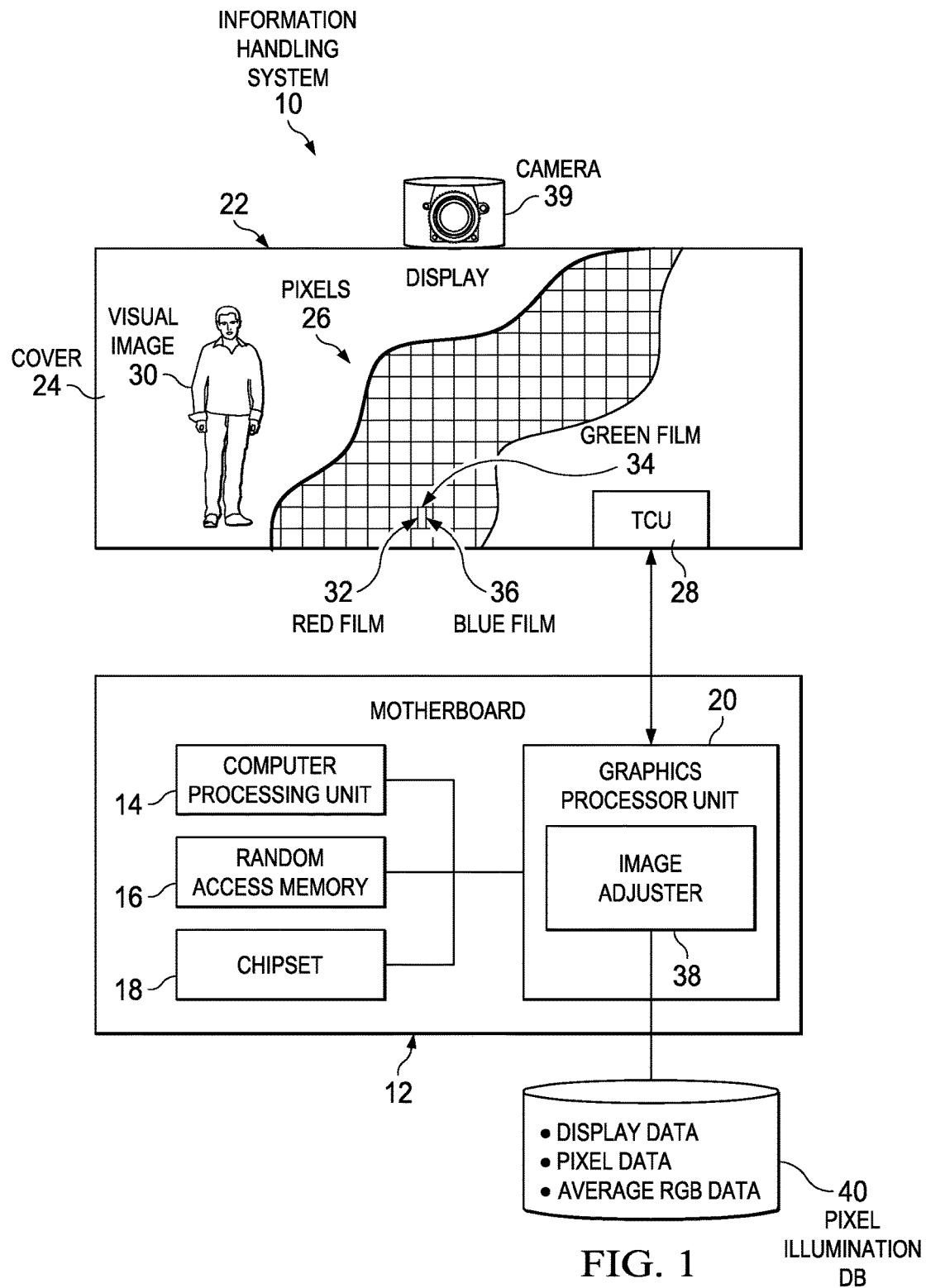
FIG. 1 depicts a block diagram of a system for adjusting color illumination to balance OLED film degradation based on user presence.

Referring now to FIG. 1, a block diagram depicts a system for adjusting color illumination to balance OLED film degradation based on user presence. An information handling system 10 generates visual information for presentation to an end user. Information handling system 10 has a motherboard 12 that supports and interfaces processing components that process information to generate visual images. In the example embodiment, a central processing unit (CPU) 14 executes instructions stored in memory, such as random access memory (RAM) 16, to generate visual information that represents visual images for presentation to an end user. A chipset 18 includes processing components and firmware instructions to manage the interaction of physical components on motherboard 18, such as the communication from CPU 14 of visual information to a graphics processor unit (GPU) 20. GPU 20 processes visual information to generate pixel values for communication to a display 22 that applies the pixel values to present the visual information as a visual image 30. For example, display 22 may be incorporated in a common housing with the processing components and interfaced with GPU 20 through an internal bus or may be interfaced as a peripheral device with a cable, such as a DisplayPort cable.

In the example embodiment, display 22 has a protective cover 24 that protects pixels 26 aligned in rows and columns to scan images under the management of a timing control unit (TCU) 28 or other processing device. Each pixel 26 includes a red OLED film 32, a green OLED film 34 and a blue OLED film 36 that illuminate according to pixel values provided from GPU 20 to provide a desired color, brightness and contrast of visual image 30. The red, green and blue films degrade as they are used so that over time a given current applied to a film will produce less illumination. Since the red, green and blue films degrade at different rates, presentation of images at display 22 that uses pixels to present a variety of colors will, over time, result in non-uniform illumination and "image sticking" in which an intended visual image 30 generated with unadjusted pixel values will have an unintended presentation. Image sticking can cause a poor user experience, especially where a solid color is presented as part of the image for an extended time period, such as a frame around a window or a screen saver.

In order to minimize OLED file degradation and to provide uniform degradation across a display over time, an image adjuster 38 running as firmware instructions on GPU 20 adjusts pixel values at one or more predetermined conditions so that uniform degradation takes place while having a minimal impact on the end user viewing experience. In one example embodiment, a camera 39 disposed at display 22 captures an image of the area in front of display 22 to detect the position of an end user viewing the display. Image adjuster 38 analyzes the image captured by the camera to determine a field of view on display 22 that the end user is viewing. Image adjuster 38 presents visual image 30 without adjustment within the field of view of the end user and adjusts pixel values for pixels outside of the field of view so that color, brightness and contrast of pixels outside of the field of view have a reduced impact on OLED film degradation. A pixel illumination database 40 tracks pixel use over time to aid image adjuster 38 in determining the degradation experienced by pixels 26 as images are presented. Image adjuster 38 references the existing degradation state of pixels 26 to select adjusted color, brightness and contrast settings that will provide improved uniformity in the level of degradation of pixels 26 across display 22.

In various embodiments, camera 39 is a depth camera that captures an end user position in a manner that allows the viewing orientation of the end user to be determined, such as the end user's head position, or is an iris scan camera that detects the direction of focus of the end user. The end user field of view location on display 22 is determined by analyzing the view angle of the end user relative to display 22 and is fed either as a resolved value or raw information to image adjuster 38. Since blue OLED film tends to degrade more quickly than red or green film, image adjuster 38 will generally seek to improve blue OLED life by reducing blue illumination at pixels located outside the end user's field of view. However, pixel illumination database 40 collects display data, such as individual pixel color and brightness illumination average over time, so that pixel adjustments may include varying amounts of blue, red and green illumination that provides uniform OLED film degradation. Pixel adjustments may include sleeping of blue OLED films at some or all pixels 26 outside of the end user field of view or creating a mixed color from red and green OLED films. When a display area is large or multiple displays are used, image adjuster 38 may adjust images for defined portions of one or more displays. Alternatively, image adjuster 38 may adjust pixel values located outside of an active display window while the end user is positioned to view the active area and then adjust the active window in the event the end user moves away from the display or looks away from the field of view. In one example embodiment, a curved display has curved portions that have illumination managed based upon end user viewing orientation relative to the curve.

Figure 2:
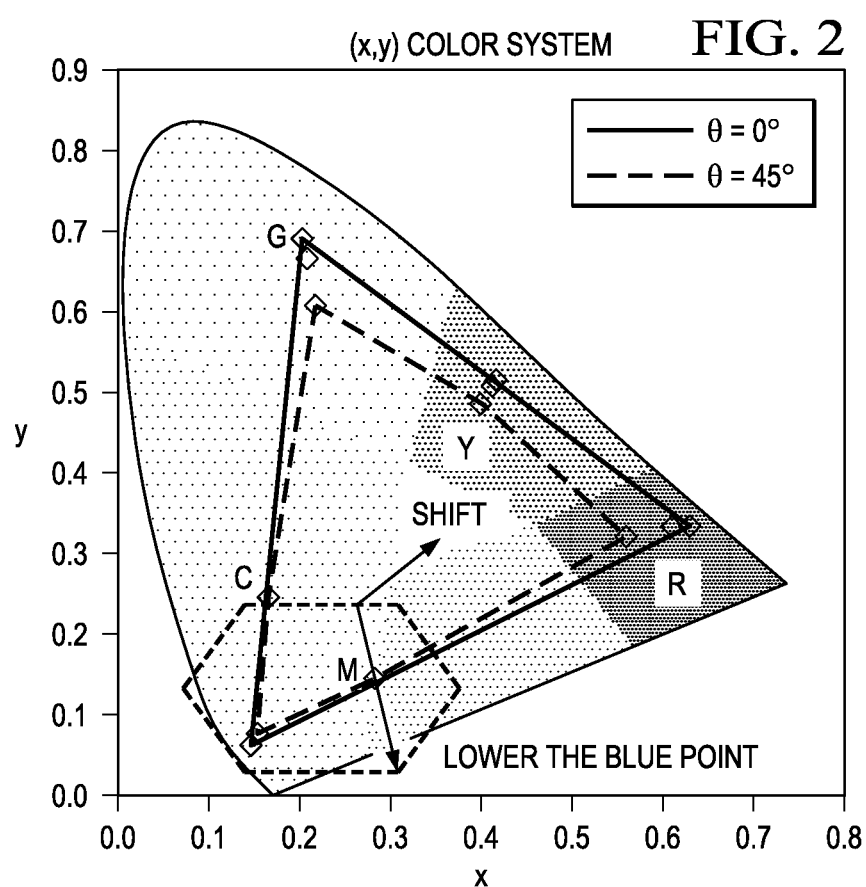
FIG. 2 depicts a shift in color presented at a display for areas of a display outside of an end user field of view.

Referring now to FIG. 2, a shift in color presented at a display is depicted for areas of a display outside of an end user field of view. In the example embodiment, GPU 20 generates colors for pixel values based on visual information provided from CPU 14 and color settings of a display. As a pixel of a display falls out of an end user's field of view, the adjusted pixel value is determined by shifting color selection to lower the blue portion of the illumination. A variety of display color management applications may be used to support the shift away from blue illumination, including eeColor, Pixelworks, and Portrait Displays.

Figure 3:
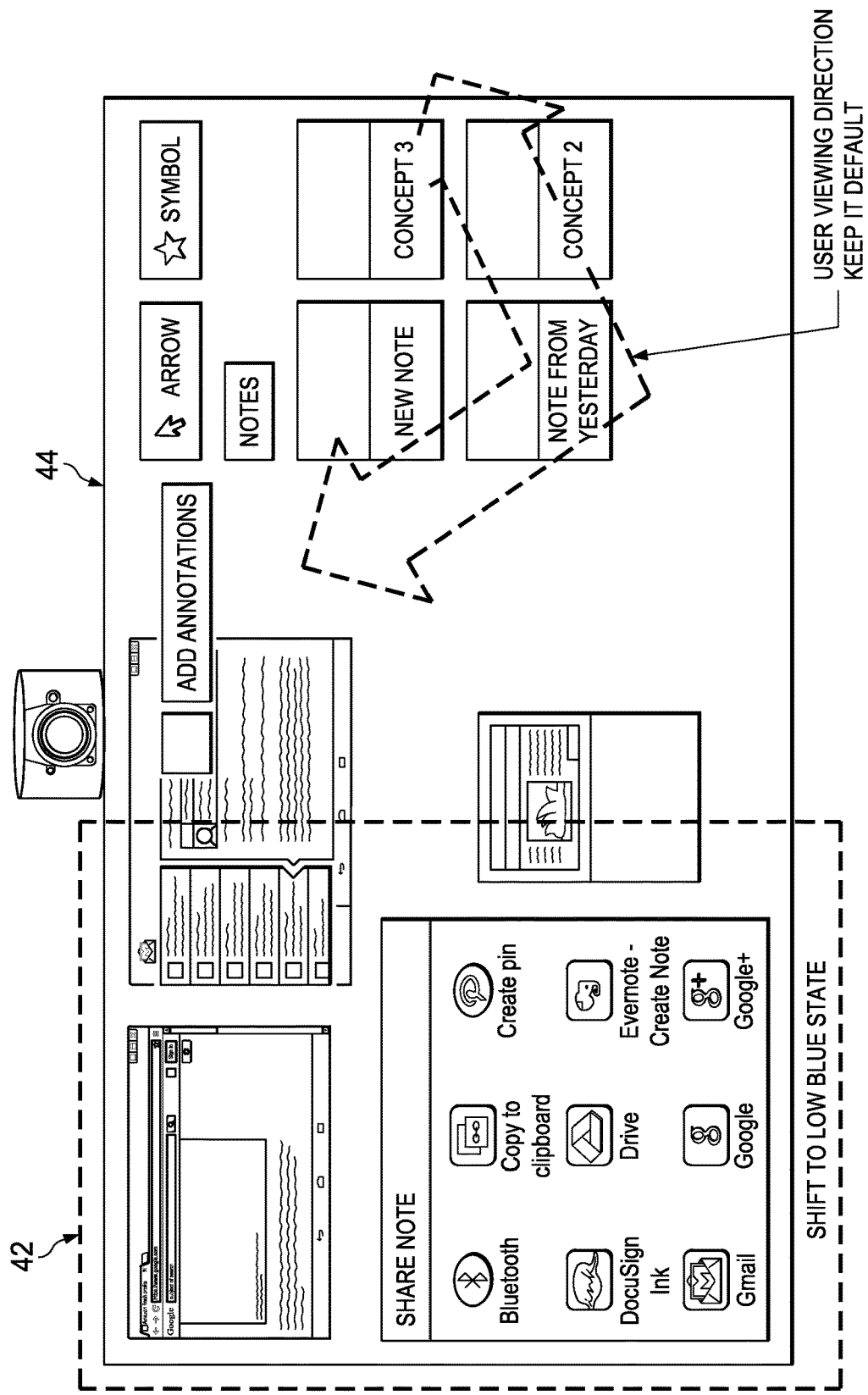
FIG. 3 depicts an example display having divided field of view areas for adjusting color at pixels to balance OLED degradation.

Referring now to FIG. 3, an example display is depicted having divided field of view areas for adjusting color at pixels to balance OLED degradation. A low-blue state portion 42 has pixel values adjusted to have a reduced blue illumination while an unadjusted portion 44 that falls in the end user's field of view based upon the end user's view direction presents pixel values with blue illumination according to display configuration settings as applied to visual information provided by the CPU. Division between two portions may be based upon a physical demarcation, such as a curved display divided in half, or a logical demarcation, such as active versus idle application windows. In one example embodiment, a first display device is treated as a first portion and a second display device is treated as a second portion so that the end user's interaction with a content presented on a selected of the displays determines which display is in the field of view and which display is not. In one embodiment, the transition from unadjusted pixel values to adjusted pixel values is provided in a gradual manner by stepping illumination in 50K CCT increments as distance increases from the end user's field of view. For example, blue illumination at a pixel is reduced in proportion to the distance of the pixel from the end user's field of view, or distance from the center of an end user's eye scan. Alternatively, an image is shifted by a scale when outside of the field of view and reverted back to the original color location when placed back into the field of view. In yet another example, when multiple end users are viewing one or more displays, averaging may be applied to define the field of view for both end users.

Figure 4:
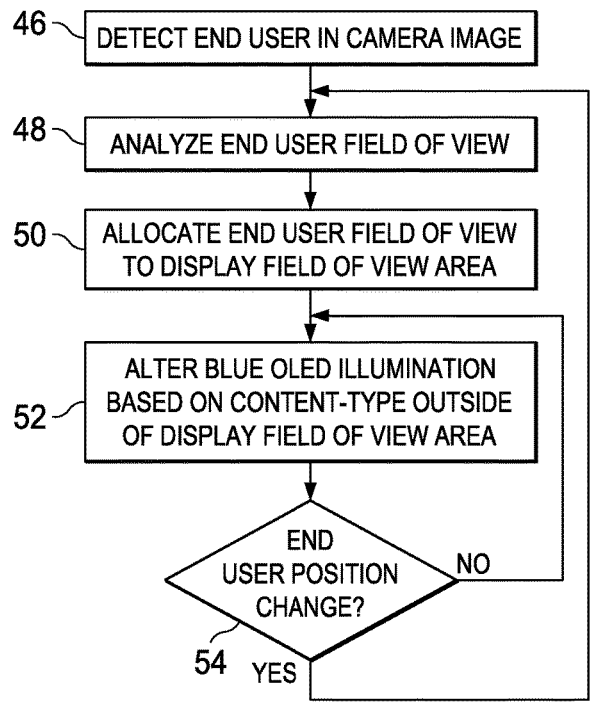
FIG. 4 depicts a flow diagram of a process for selectively altering the illumination of blue OLED films to balance OLED degradation.

Referring now to FIG. 4, a flow diagram depicts a process for selectively altering the illumination of blue OLED films to balance OLED degradation. The process starts at step 46 with detection of an end user in a camera image associated with viewing of a display. At step 48, the end user field of view is analyzed to determine what portion of a display the end user is view, such as by determining an end user's head position or eye scan direction. At step 50, the end user field of view is allocated to a display field of view that identifies the portions of the display being actively viewed by the end user. At step 52, blue OLED illumination is altered for portions outside of the field of view to reduce degradation of blue OLED film and to promote uniform degradation of red, green and blue OLED films across the display. In the example embodiment, the amount of blue OLED illumination reduction is based in part on the content-type for images presented outside of the field of view. For example, white illumination or blue illumination associated with borders or other non-functional aesthetics of a document preparation application, like Word, or other similar applications may offer an opportunity for large or even complete shutting down of blue illumination with minimal impact on the user experience. On the other hand, pictures or videos that become difficult to understand with blue color removed may have less of a blue color reduction to retain meaning for the end user. Once the adjustment of blue illumination is set, the process continues to step 54 to monitor the end user for changes in viewing position. If no changes are detected, the process returns to step 52 to adjust blue illumination based on content. If a change in end user position is detected, the process returns to step 48 to analyze and apply the new end user position. Adjusting images outside of a field of view based on content type provides an improved end user experience where a particular content type may have greater value to an end user with some coloration even if not in the field of view area of a display.

Figure 5:
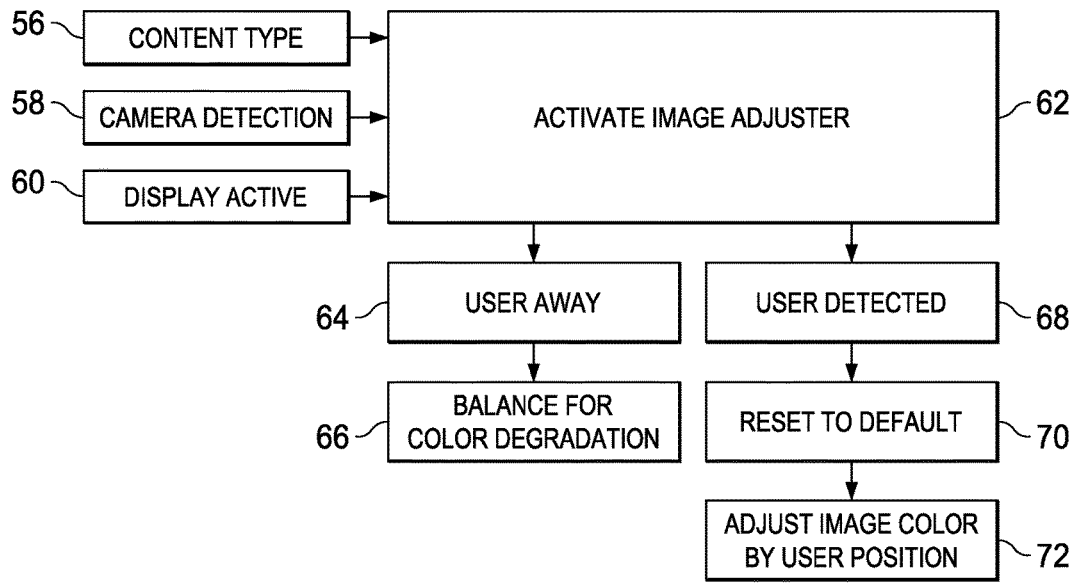
FIG. 5 depicts a functional block diagram of a system for managing selective illumination of colors at an OLED display.

Referring now to FIG. 5, a functional block diagram depicts a system for managing selective illumination of colors at an OLED display. Content type determination 56, camera-based position information 58 and display active application information 60 are provided to activate an image adjuster 62 as conditions warrant reduced illumination. For example, a user viewing a movie on an entire display area who is positioned in view of an image captured by a camera will typically not want color adjusted at portions of the display. However, that same user viewing the movie in a window at just a portion of the display typically will not mind having color illumination changed outside of the movie window. Various conditions based on content type, camera detection and display activity define initiation of image adjustment for managing OLED film degradation. Once initiated, the size of the field of view that is adjusted is managed based on user absence at block 64 or user presence at block 68. If the user is away at block 66 color balance is applied while the display remains active to encourage uniform color degradation with color illumination balance based upon historical illumination of pixels of the display. Such balance may involve adjustment to blue illumination or may also seek to balance the relative degradation of red and green OLED films by adjusting red and green illumination. If the user is present, color illumination initiates at default unadjusted settings of block 70 and then at block 72 color illumination adjusts as set forth above.

Although the present invention has been described in detail, it should be understood that various changes, substitutions and alterations can be made hereto without departing from the spirit and scope of the invention as defined by the appended claims.

What is claimed is:
1. An information handling system comprising:
 a housing;

a processor disposed in the housing and operable to execute instructions to process information;

a memory disposed in the housing and interfaced with the processor, the memory operable to store the information;

a graphics processor interfaced with the processor and memory, the graphics processor operable to process the information to generate pixel information for presenting the information at a display as visual images;

a display interfaced with the graphics processor, the display operable to present the pixel information as visual images by illuminating red, green and blue OLED material at each pixel with current adapted to generate a color defined by the pixel information;

a camera interfaced with the graphics processor and aligned to capture an image proximate the display;

a pixel illumination database storing pixel usage data to track pixel degradation; and an image adjuster stored in non-transitory memory and executable on a processor, the image adjuster interfaced with the graphics processor and camera, the image adjuster operable to detect a predetermined condition associated with the image captured by the camera, the predetermined condition including at least a field of view of an end user viewing the display, the field of view including less than all of the pixels, and in response to the predetermined condition to alter pixels outside of the field of view by reducing illumination of at least the blue material relative to the defined pixel information at pixels outside of the field of view to increase the uniformity in degradation of the pixels outside of the field of view by reference to the stored pixel degradation individual pixel color and brightness illumination over time.

2. The information handling system of claim 1 wherein the predetermined condition comprises a user location relative to the display.

3. The information handling system of claim 1 wherein the predetermined condition comprises a user eye scan direction relative to the display.

4. The information handling system of claim 3 wherein the predetermined of pixels comprises pixels at greater than a predetermined distance from the center of the user eye scan direction.

5. The information handling system of claim 4 altering the predetermined pixels comprises reducing the illumination of the blue film in proportion to the distance of the pixel from the center of the user eye scan.

6. The information handling system of claim 1 wherein the image adjuster is further operable to track display data information over time including at least illumination intensity for the red, green and blue material, and to alter the illumination of the predetermined pixels' red, green and blue OLED material to maintain balanced degradation over time.

7. The information handling system of claim 1 wherein the image adjuster is further operable to detect a type of content associated with the predetermined pixel and apply the type of content to vary the reducing the of illumination.

8. The information handling system of claim 7 wherein the image adjuster varies the reducing of the illumination by providing a greater relative amount of blue illumination for predetermined pixels associated with a video than for predetermined pixels associated with a document creation application.

9. A method for presenting images at an information handling system display, the method comprising:

presenting visual images by sending pixel values to pixels of the display, the pixel values defining a color balance of red, green and blue OLED material associated with each pixel;

detecting an end user with a camera image captured by a camera located proximate to a display;

analyzing the end user to determine a position relative to the display;

allocating a field of view of the end user from the analyzing, the field of view including at least some display pixels located in the field of view and some display pixels located outside the field of view; and reducing relative illumination of at least blue OLED film of pixels located outside the field of view, the illumination reduced to wear level pixels in the pixels outside the field of view, the reducing relative illumination to wear level including at least changing pixel color balance for the sent pixel values at each of the pixels outside the field of view to have a greater relative reduction in color illumination at each pixel outside the field of view based upon degradation of each color in each pixel, the pixels within the field of view presenting the color balance of the sent pixel values.

10. The method of claim 9 further comprising:
detecting movement of the end user in the image; and
in response to detecting movement, re-allocating the field of view based upon a change in the position of the end user relative to the display.

11. The method of claim 9 wherein analyzing the end user to determine a position relative to the display further comprises:
analyzing the end user eye position to determine a direction of gaze of the end user; and
allocating the field of view based upon the direction of gaze.

12. The method of claim 9 wherein reducing relative illumination of blue OLED film of pixels located outside the field of view further comprises:
determining a type of content associated with the pixels located outside the field of view; and
varying the reducing illumination based at least in part upon the type of content.

13. The method of claim 12 wherein the content comprises white colored background images and video images, the reducing relative illumination having a greater reduction of blue illumination for the white colored background images than the video images.

14. The method of claim 9 further comprising:
tracking pixel illumination history associated with the display over time; and
adjusting the reducing relative illumination to balance degradation of red, green and blue OLED films at the pixels over time.

15. The method of claim 9 wherein analyzing the end user to determine a position relative to the display further comprises:
presenting images at first and second displays;
analyzing the end user to determine orientation relative to the first and second displays;
allocating the field of view to one of the first or second displays based on the orientation;
illuminating the pixels of the display having the allocated field of view with display illumination settings; and
reducing illumination of blue in the display that does not have the allocated field of view.

16. The method of claim 9 further comprising:
presenting images at first and second displays;

determining the first display has an active cursor;
determining the second display lacks an active cursor;
allocating the field of view to the first display; and
excluding the second display from the field of view.

17. A system for presenting visual information as images at a display, the system comprising:
   a graphics processor unit having processing resources to process information into pixel values for presentation at a display, the pixel values defining red, green and blue OLED material illumination at each pixel, and non-transient memory for storing instructions to execute on the processing resources; and
   an image adjuster stored in the non-transient memory and operable to reduce only the blue OLED material illumination in predetermined pixel values based upon a field of view defined for the display, the image adjuster maintaining pixel values within the field of view at defined values received from the graphics processor and reducing pixel illumination values outside of the field of view, the reduced pixel illumination values wear leveling pixel degradation by reducing blue OLED material illumination values for each pixel outside the field of view.

18. The system of claim 17 further comprising a camera disposed proximate the display and operable to capture an image of an end user for application by the image adjuster to determine the field of view of the end user.

19. The system claim 17 wherein the image adjuster is further operable to apply a first reducing of illumination for pixels associated with presentation of a first type of visual image and a second reducing of illumination for pixels associated with presentation of a second type of visual image.

* * * * *

UNITED STATES PATENT AND TRADEMARK OFFICE
CERTIFICATE OF CORRECTION

PATENT NO. : 10,037,724 B2
APPLICATION NO. : 14/845648
DATED : July 31, 2018
INVENTOR(S) : Kenneth Musgrave, Stefan Peana and Deeder M. Aurongzeb Page 1 of 1

It is certified that error appears in the above-identified patent and that said Letters Patent is hereby corrected as shown below:

In the Claims

In Column 7, Line 58, Claim 7 please remove --the-- after "reducing";
In Column 8, Line 13, Claim 9 please replace "film" with --material--;
In Column 10, Line 11, Claim 18 please add --of-- after "system".

Signed and Sealed this
Twenty-fifth Day of September, 2018

Andrei Iancu
*Director of the United States Patent and Trademark Office*